(12) United States Patent
Mehta et al.

(10) Patent No.: US 9,790,390 B2
(45) Date of Patent: Oct. 17, 2017

(54) THERMOCHROMIC INK AND DOCUMENT PRINTED THEREWITH

(75) Inventors: Rajendra Mehta, Centerville, OH (US); Richard L. Shields, Centerville, OH (US)

(73) Assignee: Standard Register, Inc., North Mankato, MN (US)

( * ) Notice: Subject to any disclaimer, the term of this patent is extended or adjusted under 35 U.S.C. 154(b) by 1747 days.

(21) Appl. No.: 12/917,865

(22) Filed: Nov. 2, 2010

(65) Prior Publication Data

US 2012/0104743 A1    May 3, 2012

(51) Int. Cl.
*B42D 15/00* (2006.01)
*B42D 15/10* (2006.01)
(Continued)

(52) U.S. Cl.
CPC .............. *C09D 11/50* (2013.01); *B42D 25/29* (2014.10); *C09D 5/26* (2013.01); *D21H 19/12* (2013.01); *D21H 21/48* (2013.01); *B41M 5/282* (2013.01); *B42D 2033/04* (2013.01); *B42D 2033/20* (2013.01); *B42D 2035/24* (2013.01); *B42D 2035/34* (2013.01); *D21H 21/54* (2013.01)

(58) Field of Classification Search
USPC .............. 283/72, 94, 95, 96, 98, 114, 901
See application file for complete search history.

(56) References Cited

U.S. PATENT DOCUMENTS 4,028,118 A * 6/1977 Nakasuji et al. .......... 106/31.19
5,465,301 A   11/1995 Jotcham et al.
(Continued)

FOREIGN PATENT DOCUMENTS

DE    199 41 295 A1    3/2001
EP    0 608 078 A1    7/1994

OTHER PUBLICATIONS

PCT International Search Report and Written Opinion dated Mar. 2, 2012 pertaining to PCT Application No. PCT/US2011/052855.
(Continued)

*Primary Examiner* — David Bryant
*Assistant Examiner* — Justin V Lewis
(74) *Attorney, Agent, or Firm* — Patterson Thuente Pedersen, P.A.

(57) ABSTRACT

A document which may be a security document has a thermochromic coating which may be a thermochromic ink on the substrate of the document. The ink may include several thermochromic materials which transition from various different colors to substantially clear in appearance as the ink is warmed to various temperatures. The combination of the colors of the thermochromic materials can give the document a different color at a number of different temperatures, until the coating is warmed to the highest color change point. When at or above the highest color change temperature, the coating becomes substantially transparent and the printed area assumes the color of the underlying substrate. The coating may also include non-reactive materials of yet another color that mixes with the colors of the thermochromic materials. The document may additionally include printed indicia on the substrate that are masked by the thermochromic materials at certain temperatures, and not masked by the thermochromic materials at other temperatures.

41 Claims, 2 Drawing Sheets

(51) Int. Cl.
*C09D 11/50* (2014.01)
*C09D 5/26* (2006.01)
*D21H 19/12* (2006.01)
*D21H 21/48* (2006.01)
*B42D 25/29* (2014.01)
B41M 5/28 (2006.01)
D21H 21/54 (2006.01)

(56) References Cited

U.S. PATENT DOCUMENTS

| | | |
|---|---|---|
| 5,826,915 A | 10/1998 | Gregory, Jr. |
| 6,413,305 B1 | 7/2002 | Mehta et al. |
| 6,607,813 B2 | 8/2003 | Washburn et al. |
| 6,616,190 B1 | 9/2003 | Jotcham |
| 6,692,030 B1 | 2/2004 | Phillips |
| 6,709,018 B2 | 3/2004 | Phillips |
| 6,783,991 B1 | 8/2004 | Mehta et al. |
| 7,198,842 B2 | 4/2007 | Rancien et al. |
| 7,316,422 B1 * | 1/2008 | Schmitz .......................... 283/91 |
| 2005/0064151 A1 | 3/2005 | Mehta et al. |
| 2007/0281139 A1 | 12/2007 | Mehta et al. |
| 2009/0294534 A1 | 12/2009 | Pepori et al. |

OTHER PUBLICATIONS

Color-changing inks; Reprinted from the McGraw-Hill Yearbook of Science & Technology 2008; pp. 1-3; The McGraw-Hill Companies, Inc. 2007.
Final Office Action dated Mar. 27, 2014 pertaining to U.S. Appl. No. 13/906,545.

* cited by examiner

… (1)

THERMOCHROMIC INK AND DOCUMENT PRINTED THEREWITH

CROSS-REFERENCE TO RELATED APPLICATION

Not applicable.

STATEMENT REGARDING FEDERALLY SPONSORED RESEARCH OR DEVELOPMENT

Not applicable.

BACKGROUND

This is directed generally to thermochromic coatings and inks and to documents, such as for example security documents, that incorporate such coatings and inks. The use of thermochromic inks for printing documents of various types is well known. Security documents, such as currency, checks and related negotiable instruments, as well as personnel identification devices, such as birth certificates, social security cards and driver's licenses, are all subject to being counterfeited. Various techniques have been used to make these sorts of documents difficult to replicate accurately. Some techniques are effective but require that the recipient of the document have special materials or equipment to authenticate documents. An example of such a technique is printing with special, chemically reactive inks which reversibly change color when subjected to solvent from a solvent pen, but which revert to their original color when dry. Other techniques, such as micro printed messages and ribbons of special material embedded in the document substrate, require special printing techniques and expensive paper or other document substrate material. Thermochromic inks printed on security documents have offered a method of verifying document authenticity which requires no special equipment or materials. When a security document printed with a thermochromic ink is warmed, such as by exposure to an individual's skin or breath, a color change will be observed and the document authenticated to some degree.

Other applications have been found for thermochromic inks and coatings. A thermochromic ink printed on the surface of a product, such as for example a drink container, may indicate to an observer whether the product is the proper temperature for use or consumption. Additionally, thermochromic inks have been used on novelty devices of various sorts.

The thermochromic inks previously in use have incorporated leuco dyes and have typically assumed one of two temperature dependent states—one in which the ink appears as a predetermined color and one in which the ink is substantially transparent or appears as a different color. This has been somewhat limiting. It might be desirable in some applications for a thermochromic ink to achieve more than two colors as the temperature of the ink is changed.

SUMMARY

This need may be met by a document having a substrate, and a coating on an area of the substrate. The coating includes a first thermochromic material that appears as a first color when it is below a first temperature and that appears substantially transparent when it is above the first temperature. The coating includes a second thermochromic material that appears as a second color when it is below a second temperature and that appears substantially transparent when it is above the second temperature. The second temperature is higher than the first temperature. The area of the substrate appears as a third color which is a mixture of the first and second colors when the coating is at a temperature that is less than the first temperature. The area of the substrate appears as the second color when the coating is at a temperature that is less than the second temperature and greater than the first temperature. Finally, the area of the substrate appears as the color of the substrate when the coating is at a temperature that is greater than the second temperature.

The document may bear printed indicia in the area of the substrate which is revealed when both of the thermochromic materials become substantially transparent. The printed indicia may be printed in an ink of the second color, whereby the printed indicia are effectively masked by the coating. The coating may be an ink which may printed on the substrate in the area with an ink jet printer, a flexographic printing press, an offset printing press, a letterpress printing press, or other known printing system. The coating may be printed on the substrate in a pattern. The first, second, and third colors may all differ, and the substrate may be a fourth color which differs from the first, second, and third colors. The first and second thermochromic materials each may include microencapsulated leuco dyes. The substrate may comprise a cut sheet. Alternatively, the substrate may comprise a continuous roll or flat pack.

The coating may additionally include a third thermochromic material that appears as a third color when it is below a third temperature and that appears substantially transparent when it is above the third temperature. The second temperature is higher than the first temperature and the third temperature is higher than the second temperature. The area of the substrate appears as a fourth color which may be a mixture of the first, second, and third colors when the coating is at a temperature that is less than the first temperature. With this coating, the area of the substrate appears as the fifth color which is a mixture of the second and third colors when the coating is at a temperature that is less than the second temperature and greater than the first temperature. The area of the substrate appears as the third color when the coating is at a temperature that is less than the third temperature and greater than the second temperature. Finally, the area of the substrate appears as the color of the substrate when the coating is at a temperature that is greater than the third temperature. The document may bear printed indicia in the area of the substrate that is revealed when all three of the thermochromic materials become substantially transparent. The printed indicia may be printed in an ink of the third color, whereby the printed indicia is effectively masked by the coating until the third coating becomes transparent.

The coating may be an ink which is printed on the substrate in the area. The ink may be printed with an ink jet printer, a flexographic printing press, an offset printing press, a letterpress printing press, or other printing system. The coating may be printed on the substrate in a pattern. The first, second, and third colors all may differ. The substrate may be a fourth color which differs from the first, second, and third colors. The first, second, and third thermochromic materials may each include microencapsulated leuco dyes. The substrate may comprise a cut sheet or, alternatively, the substrate may comprise a continuous roll or flat pack.

In another embodiment, the coating may include a first thermochromic material that appears as a first color when it is below a first temperature and that appears substantially transparent when it is above the first temperature. The coating includes a second thermochromic material that appears as a second color when it may be below a second temperature and that appears substantially transparent when it may be above the second temperature. The coating also includes a non-reactive material of a third color. The second temperature is higher than the first temperature, whereby the area of the substrate appears as a fourth color which may be a mixture of the first, second, and third colors when the coating is at a temperature that is less than the first temperature, the area of the substrate appears as the fifth color which is a mixture of the second and third colors when the coating is at a temperature that is less than the second temperature and greater than the first temperature, and the area of the substrate appears as the third color when the coating is at a temperature that is greater than the second temperature.

The document may bear printed indicia in the area of the substrate which is revealed when the first and second thermochromic materials become substantially transparent. The printed indicia may be printed in an ink of the second color, whereby the printed indicia may be effectively masked by the coating. The coating may be an ink which may be printed on the substrate in the area. The ink may be printed with an ink jet printer, a flexographic printing press, an offset printing press, a letterpress printing press, or other printing system. The coating may be printed on the substrate in a pattern. The first, second, and third colors all differ. The first and second thermochromic materials may each include microencapsulated leuco dyes. The substrate may comprises a cut sheet. Alternatively, the substrate may comprise a continuous roll or flat pack.

A thermochromic ink includes a first thermochromic material and a second thermochromic material. The first thermochromic material appears as a first color when it is below a first temperature and appears substantially transparent when it is above the first temperature. The second thermochromic material appears as a second color when it is below a second temperature and appears substantially transparent when it is above the second temperature. The second temperature is higher than the first temperature. The ink appears as a third color which is a mixture of the first and second colors when the ink is at a temperature that is less than the first temperature, the ink appears as the second color when the ink is at a temperature that is less than the second temperature and greater than the first temperature, and the ink appears substantially colorless when the ink is at a temperature that is greater than the second temperature.

The first, second, and third colors all differ. The first and second thermochromic materials may each include microencapsulated leuco dyes.

A thermochromic ink includes a first thermochromic material, a second thermochromic material, and a third thermochromic material. The first thermochromic material appears as a first color when it is below a first temperature and appears substantially transparent when it is above the first temperature. The second thermochromic material appears as a second color when it is below a second temperature and appears substantially transparent when it is above the second temperature. The third thermochromic material appears as a third color when it is below a third temperature and appears substantially transparent when it is above the third temperature. The second temperature is higher than the first temperature and the third temperature is higher than the second temperature. The ink appears as a fourth color which is a mixture of the first, second, and third colors when the ink is at a temperature that is less than the first temperature. The ink appears as a fifth color which is a mixture of the second and third colors when the ink is at a temperature that is less than the second temperature and greater than the first temperature. The ink appears as the third color when the ink is at a temperature that is less than the third temperature and greater than the second temperature. Finally, the ink appears substantially transparent when the ink is at a temperature that is greater than the third temperature.

The first, second, and third colors all differ. The first and second thermochromic materials each include microencapsulated leuco dyes.

DETAILED DESCRIPTION OF THE PREFERRED EMBODIMENT

Figure 1:
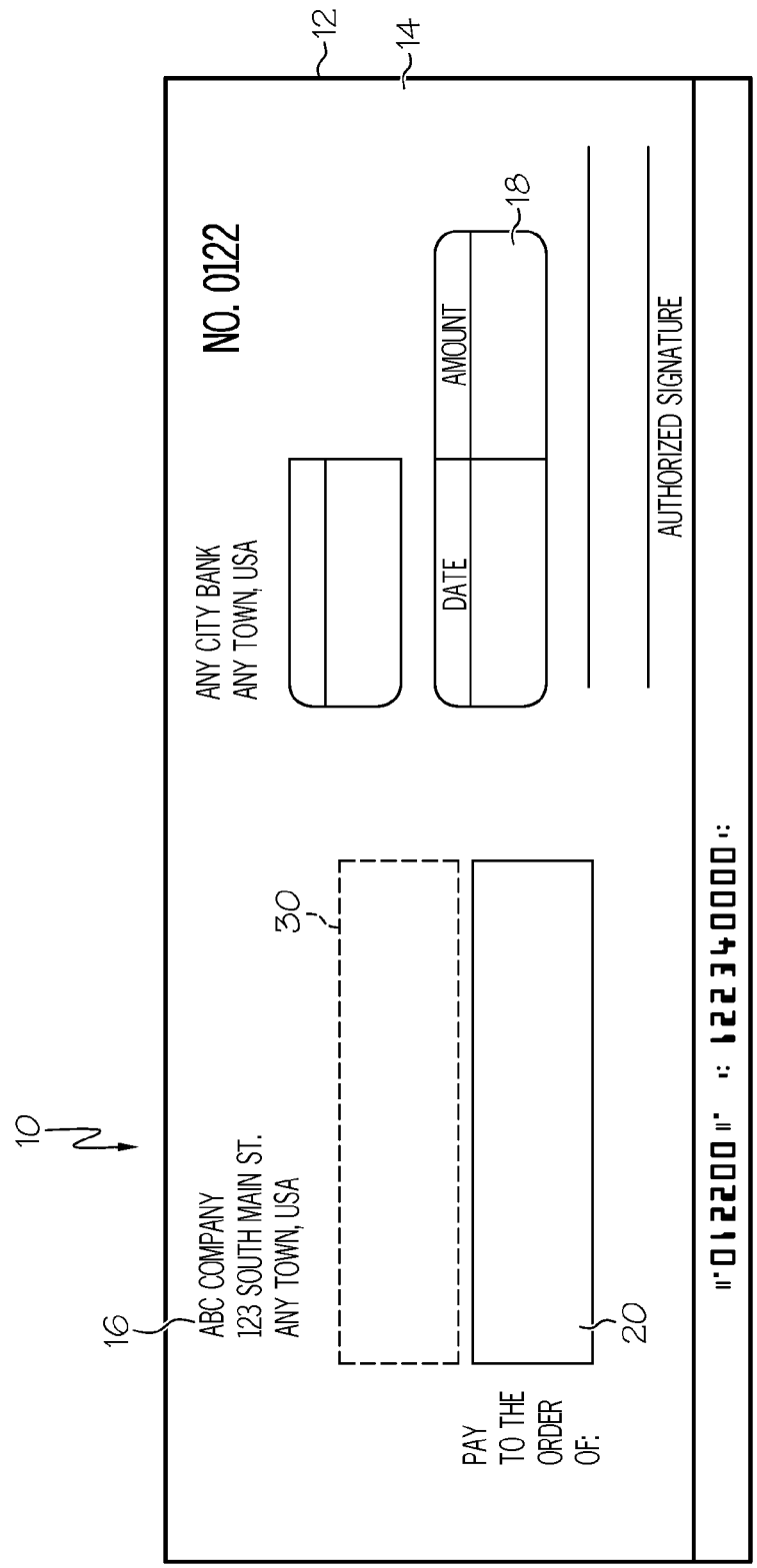
FIG. 1 is a front elevation view of a security document printed with a thermochromic ink.
Figure 2:
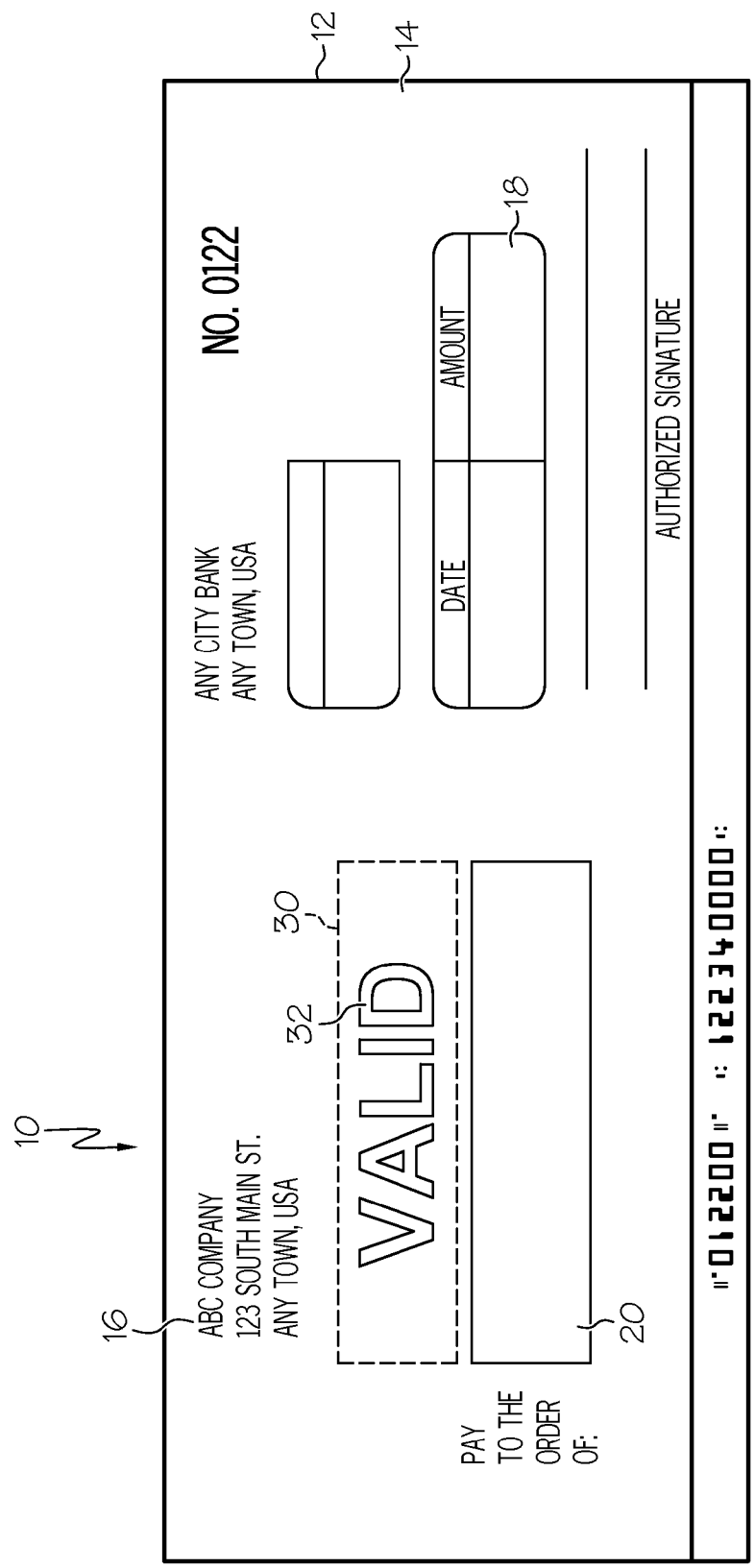
FIG. 2 is a front elevation view of a security document of FIG. 1, after the document has been warmed to a higher temperature to reveal printed indicia.

Reference is made to FIGS. 1 and 2 which show a document, illustrated as a security document in the form of a check 10. The check 10 has a substrate 12 and a coating, such as a thermochromic ink, disposed on one or more areas of the front surface 14 of the substrate 12. Although the embodiment depicted is a check, it will be appreciated that other types of documents will also benefit from the application of a coating having thermochromic materials. The thermochromic ink may be applied to security documents, such as checks, money orders, negotiable certificates or other documents of value, as well as business forms, or other documents in which it is desirable to provide a color change for authentication purposes or other purposes. The thermochromic ink may be applied to novelty products, and to packaging or labels for products for which an indication of approximate temperature is needed or desired. The thermochromic ink composition on check 10 may include a) a thermochromic aqueous slurry, and b) an ink vehicle selected from the group consisting of 1) a phenolic modified rosin and an oil compatible with the rosin, 2) at least one styrene maleic anhydride resin and a glycol, or 3) an acrylic resin varnish. Such ink compositions are disclosed in commonly assigned U.S. Pat. No. 6,413,305. U.S. Pat. No. 6,413,305 is hereby incorporated by reference in its entirety. Other ink vehicles, however, may be used as well.

The thermochromic ink is printed onto the surface 14 of the check 10 in desired areas of the check. It will be appreciated, however, that the surface 14 of the check 10 may be coated with a layer of the ink by a process other than printing. For example, the entire surface of the check may be coated with the ink. Additionally, the entire surface 14 of the check 10 may be printed or coated with thermochromic ink. In any event, the ink on the surface 14 includes a first thermochromic material that appears as a first color when it is below a first temperature and that appears substantially transparent when it is above the first temperature. The ink coating includes a second thermochromic material that appears as a second color when it is below a second temperature and that appears substantially transparent when it is above the second temperature, the second temperature being higher than the first temperature. This combination of materials results in the unique feature of a thermochromic coating that causes the coated area of the substrate to appear as a third color which is a mixture of the first and second colors when the coating is at a temperature that is less than the first temperature. The coated area of the substrate appears as the second color when the coating is at a temperature that is less than the second temperature and greater than the first temperature. Finally, the area of the substrate appears as the color of the substrate when the coating is at a temperature that is greater than the second temperature, since both of the thermochromic materials then become substantially transparent. For example, the first color may be blue and the second color may be yellow. With this combination, when the coating is less than the first temperature and both of the materials are contributing to the color of the area, the coated area appears to be a blue-green color. When the composition is warmed, for example by the body heat of a person examining the document, the area changes to a yellow color. Finally, when the coating is warmed further, for example as a result of the friction produced by rubbing the document in the coated area, the document assumes the color of the underlying substrate surface since both thermochromic materials become essentially transparent.

The document 10 may bear printed indicia 32 in the area 30 of the substrate 12. The indicia 32, printed in a non-reactive ink, will provide a message which is obscured when the coating is within some temperature ranges, and revealed when it is within other temperature ranges, and revealed when it is within other temperature ranges. For example, the indicia 32 may be revealed when both of the thermochromic materials in the ink become substantially transparent. The printed indicia 32 may be printed in an ink of the second color, such as yellow. In this arrangement, the printed indicia are effectively masked by the coating when the coating is at a temperature that is less than the second temperature. The coating may be an ink that is printed over the area 30 with any of a number of printing systems, including an ink jet printer, a flexographic printing press, an offset printing press, a letterpress printing press, a letter press, or any other printing arrangement. The ink may be printed as a uniform layer over the substrate 12, or printed on the substrate in a pattern. The first, second, and third colors may all differ. The substrate may be a fourth color which differs from the first, second, and third colors. The first and second thermochromic materials each include microencapsulated leuco dyes. Finally the substrate may comprise a cut sheet, or may comprise a continuous roll or flat pack.

The following are three examples of thermochromic inks that function in this manner. The base binder formulation that may be used with all of the inks is as follows:

| | | |
|---|---|---|
| 1. | Water | 37.5% |
| 2. | Urea (Aldrich Chemical Co., Milwaukee, WI) | 21.37% |
| 3. | Dow DL-233 (Dow Chemical Co., Midland, MI) | 14.3% |
| 4. | Celvol 21-205 (Celanese Corp., Dallas, TX) | 23.47% |
| 5. | Se-23 (Wacker Silicones, Adrian, MI) | 2.5% |
| 6. | Silwet L-77 (OSi Specialties, Danbury, CT) | 0.74% |

It should be appreciated, however, that this binder formulation is only exemplary, and that any of a number binder formulations may also be used.

The examples of thermochromic ink formulations that incorporate this base binder are as follows:

Example 1

| | | |
|---|---|---|
| 1. | Base Binder | 61.0% |
| 2. | Rose color thermochromic capsules @ 87-90° F. | 18.2% |
| 3. | Blue color thermochromic capsules @ 100-105° F. | 20.75% |

This formulation provides an initial purple color at room temperature and, when warmed above approximately 87-90° F., it changes to blue. After the formulation is warmed further, to approximately 100-105° F., it changes to clear. It may be seen, therefore, that the ink starts as purple in color, then changes to blue when it is warmed, and then changes to clear when it is warmed further. When the ink is clear, the substrate on which it is deposited may be seen through the ink.

Example 2

| | | |
|---|---|---|
| 1. | Binder | 61.0% |
| 2. | Blue color thermochromic capsules @ 87-90° F. | 18.3% |
| 3. | Rose color thermochromic capsules @ 100-105° F. | 20.75% |

This formulation provides an initial purple color at room temperature and, when warmed above approximately 87-90° F., it changes to pink. After the formulation is warmed further, to approximately 100-105° F., it changes to clear. This ink is initially purple in color at room temperature, then changes to pink when it is warmed, and then changes to clear when it is warmed further.

Example 3

| | | |
|---|---|---|
| 1. | Binder | 61.0% |
| 2. | Vermillion color thermochromic capsules @ 87-90° F. | 18.3% |
| 3. | Rose color thermochromic capsules @ 100-105° F. | 20.75% |

This formulation provides an initial orange color at room temperature and, when warmed above approximately 87-90° F., it changes to pink. After the formulation is warmed further, to approximately 100-105° F., it changes to clear. This ink is initially orange in color at room temperature, then changes to pink when it is warmed, and then changes to clear when it is warmed further.

The coating may also be formulated to shift among three colors as it is warmed to successively higher temperatures before changing to essentially transparent or clear after it exceeds the highest predetermined temperature. With this arrangement, the coating includes a first thermochromic material that appears as a first color when it is below a first temperature and that appears substantially transparent when it is above the first temperature. The coating includes a second thermochromic material that appears as a second color when it is below a second temperature and that appears substantially transparent when it is above the second temperature. Finally, the coating includes a third thermochromic material that appears as a third color when it is below a third temperature and that appears substantially transparent when it is above the third temperature. The second temperature is higher than the first temperature and the third temperature is higher than the second temperature. With this coating, the area of the substrate appears as a fourth color which is a mixture of the first, second, and third colors when the coating is at a temperature that is less than the first temperature. The area of the substrate appears as a fifth color which is a mixture of the second and third colors when the coating is at a temperature that is less than the second temperature and greater than the first temperature. The area of the substrate appears as the third color when the coating is at a temperature that is less than the third temperature and greater than the second temperature. Finally, the area of the substrate appears as the color of the substrate when the coating is at a temperature that is greater than the third temperature, since above the third temperature all three of the materials become transparent.

With this thermochromic coating, the document can be printed with indicia using a non-reactive ink so that the indicia are obscured until all three thermochromic materials become substantially transparent at a temperature above the third temperature. The printed indicia may be printed in an ink of the third color, since this may more effectively be masked by the coating. An example of a thermochromic ink formation that functions in this manner is as follows:

Example 4

| 1. | Binder base | 64.7% |
| 2. | Pink thermochromic capsules @ 32° F. | 35.0% |
| 3. | Blue thermochromic capsules @ 87° F. | 19.3% |
| 4. | Green thermochromic capsules @ 92-95° F. | 22.0% |

This formulation provides an initial purple color, changing in succession to two other colors during warming, before finally changing to clear.

Yet another effect can be achieved with a slightly different thermochromic coating. This coating, like the others, includes first, and second thermochromic materials that are first and second colors when the coating is at a temperature that is less than a first predetermined temperature, and that transitions to a substantially clear state when the temperature of the coating is above a second temperature. This coating further includes a non-reactive material of a third color. The area of the substrate that carries this coating appears as a fourth color which is a mixture of the first, second, and third colors when the coating is at a temperature that is less than the first temperature. This area of the substrate appears as a fifth color which is a mixture of the second and third colors when the coating is at a temperature that is less than the second temperature. When the coating is at a temperature that is greater than the first temperature, and the area of the substrate appears as the third color when the coating is at a temperature that is greater than the second temperature. As with the previously described ink embodiments, this embodiment can mask printing which is only revealed when a certain temperature is achieved for the coating.

The following are two examples of thermochromic inks that function in this manner.

Example 5

| 1. | Binder base | 61.0% |
| 2. | Blue thermochromic capsules @ 87-90° F. | 18.3% |
| 3. | Rose thermochromic capsules @ 100-105° F. | 20.5% |
| 4. | Water soluble yellow dye | 0.25% |

This formulation provides an initial purple color at room temperature and, when warmed above approximately 87-90° F., it changes to orange/pink. After the formulation is warmed further, to approximately 100-105° F., it changes to yellow. This ink is initially purple in color at room temperature, then changes to orange/pink when it is warmed, and then changes to yellow when it is warmed further.

Example 6

| 1. | Binder base | 61.0% |
| 2. | Rose thermochromic capsules @ 87-90° F. | 18.3% |
| 3. | Blue thermochromic capsules @ 100-105° F. | 20.5% |
| 4. | Water soluble yellow dye | 0.25% |

This formulation provides an initial purple color at room temperature and, when warmed above approximately 87-90° F., it changes to green/blue. After the formulation is warmed further, to approximately 100-105° F., it changes to yellow. This ink is initially purple in color at room temperature, then changes to green/blue when it is warmed, and then changes to yellow when it is warmed further.

While certain representative embodiments and details have been shown for purposes of illustrating the invention, it will be apparent to those skilled in the art that various changes in the methods and apparatus disclosed herein may be made without departing from the scope of the invention, which is defined in the appended claims. For example, the thermochromic materials in the coating can be selected so that the first, second and third temperatures at which the thermochromic materials change colors or transition from a color to a clear appearance can be set at desirable temperatures. It will be appreciated that the chosen temperatures will be a function of the nature of the product or document, and the purpose to which the color change is being put.

What is claimed is:

1. A document, comprising:
a substrate; and
a coating disposed as a uniform layer on an area of said substrate, said coating including a first thermochromic material that appears as a first color when it is below a first temperature and that appears substantially transparent when it is above said first temperature, said coating including a second thermochromic material that appears as a second color when it is below a second temperature and that appears substantially transparent when it is above said second temperature, said second temperature being higher than said first temperature, whereby said coating disposed on said area of said substrate appears as a third color which is a mixture of said first and second colors when said coating is at a temperature that is less than said first temperature, said coating disposed on said area of said substrate appears as said second color when said coating is at a temperature that is less than said second temperature and greater than said first temperature, and said coating disposed on said area of said substrate appears as the color of said substrate when said coating is at a temperature that is greater than said second temperature.

2. The document of claim 1, in which said document bears printed indicia in said area of said substrate which are revealed when both of said thermochromic materials become substantially transparent.

3. The document of claim 2, in which said printed indicia are printed in an ink of said second color, whereby said printed indicia are effectively masked by said coating.

4. The document of claim 1, in which said coating is an ink which is printed on said substrate in said area.

5. The document of claim 4, wherein said ink is printed with an ink jet printer.

6. The document of claim 4, wherein said ink is printed with a flexographic printing press.

7. The document of claim 4, wherein said ink is printed with an offset printing press.

8. The document of claim 4, wherein said ink is printed with a letterpress printing press.

9. The document of claim 1, in which said coating is printed on said substrate in a pattern.

10. The document of claim 1, in which said first, second, and third colors all differ.

11. The document of claim 10, in which said substrate is a fourth color which differs from said first, second, and third colors.

12. The document of claim 1, in which said first and second thermochromic materials each include microencapsulated leuco dyes.

13. The document of claim 1, wherein said substrate comprises a cut sheet.

14. The document of claim 1, wherein said substrate comprises a continuous roll or folded flat pack.

15. A document, comprising:
a substrate; and
a coating disposed as a uniform layer on an area of said substrate, said coating including a first thermochromic material that appears as a first color when it is below a first temperature and that appears substantially transparent when it is above said first temperature, said coating including a second thermochromic material that appears as a second color when it is below a second temperature and that appears substantially transparent when it is above said second temperature, said coating including a third thermochromic material that appears as a third color when it is below a third temperature and that appears substantially transparent when it is above said third temperature, said second temperature being higher than said first temperature and said third temperature being higher than said second temperature, whereby said coating disposed on said area of said substrate appears as a fourth color which is a mixture of said first, second, and third colors when said coating is at a temperature that is less than said first temperature, said coating disposed on said area of said substrate appears as a fifth color which is a mixture of said second and third colors when said coating is at a temperature that is less than said second temperature and greater than said first temperature, said coating disposed on said area of said substrate appears as said third color when said coating is at a temperature that is less than said third temperature and greater than said second temperature, and said coating disposed on said area of said substrate appears as the color of said substrate when said coating is at a temperature that is greater than said third temperature.

16. The document of claim 15, in which said document bears printed indicia in said area of said substrate which are revealed when all three of said thermochromic materials become substantially transparent.

17. The document of claim 16, in which said printed indicia are printed in an ink of said third color, whereby said printed indicia are effectively masked by said coating.

18. The document of claim 15, in which said coating is an ink which is printed on said substrate in said area.

19. The document of claim 18, wherein said ink is printed with an ink jet printer.

20. The document of claim 18, wherein said ink is printed with a flexographic printing press.

21. The document of claim 18, wherein said ink is printed with an offset printing press.

22. The document of claim 18, wherein said ink is printed with a letterpress printing press.

23. The document of claim 15, in which said coating is printed on said substrate in a pattern.

24. The document of claim 15, in which said first, second, and third colors all differ.

25. The document of claim 15, in which said substrate is a fourth color which differs from said first, second, and third colors.

26. The document of claim 15, in which said first, second, and third thermochromic materials each include microencapsulated leuco dyes.

27. The document of claim 15, wherein said substrate comprises a cut sheet.

28. The document of claim 15, wherein said substrate comprises a continuous roll or folded flat pack.

29. A document, comprising:
a substrate; and
a coating disposed as a uniform layer on an area of said substrate, said coating including a first thermochromic material that appears as a first color when it is below a first temperature and that appears substantially transparent when it is above said first temperature, said coating including a second thermochromic material that appears as a second color when it is below a second temperature and that appears substantially transparent when it is above said second temperature, said coating including a non-reactive material of a third color, said second temperature being higher than said first temperature, whereby said coating disposed on said area of said substrate appears as a fourth color which is a mixture of said first, second, and third colors when said coating is at a temperature that is less than said first temperature, said coating disposed on said area of said substrate appears as a fifth color which is a mixture of said second and third colors when said coating is at a temperature that is less than said second temperature and greater than said first temperature, and said coating disposed on said area of said substrate appears as said third color when said coating is at a temperature that is greater than said second temperature.

30. The document of claim 29, in which said document bears printed indicia in said area of said substrate which are revealed when said first and second thermochromic materials become substantially transparent.

31. The document of claim 30, in which said printed indicia are printed in an ink of said second color, whereby said printed indicia are effectively masked by said coating.

32. The document of claim 29, in which said coating is an ink which is printed on said substrate in said area.

33. The document of claim 32, wherein said ink is printed with an ink jet printer.

34. The document of claim 32, wherein said ink is printed with a flexographic printing press.

35. The document of claim 32, wherein said ink is printed with an offset printing press.

36. The document of claim 32, wherein said ink is printed with a letterpress printing press.

37. The document of claim 29, in which said coating is printed on said substrate in a pattern.

38. The document of claim 29, in which said first, second, and third colors all differ.

39. The document of claim 29, in which said first and second thermochromic materials each include microencapsulated leuco dyes.

40. The document of claim 29, wherein said substrate comprises a cut sheet.

41. The document of claim 29, wherein said substrate comprises a continuous roll or flat pack.

* * * * *